(12) United States Patent
Liu

(10) Patent No.: US 11,205,346 B2
(45) Date of Patent: Dec. 21, 2021

(54) TRAFFIC INFORMATION UPDATE METHOD AND APPARATUS

(71) Applicant: Honor Device Co., Ltd., Shenzhen (CN)

(72) Inventor: Hongtao Liu, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 16/731,718

(22) Filed: Dec. 31, 2019

(65) Prior Publication Data

US 2020/0279479 A1 Sep. 3, 2020

Related U.S. Application Data

(63) Continuation of application No. 15/577,952, filed as application No. PCT/CN2015/080181 on May 29, 2015, now Pat. No. 10,553,111.

(51) Int. Cl.
*G08G 1/09* (2006.01)
*G08G 1/04* (2006.01)
(Continued)

(52) U.S. Cl.
CPC ........... *G08G 1/09* (2013.01); *G01C 21/3602* (2013.01); *G08G 1/012* (2013.01); *G08G 1/0129* (2013.01);
(Continued)

(58) Field of Classification Search
CPC ........ G08G 1/09; G08G 1/012; G08G 1/0129; G08G 1/04; G08G 1/0967;
(Continued)

(56) References Cited

U.S. PATENT DOCUMENTS 6,401,239 B1  6/2002  Miron
6,694,335 B1  2/2004  Hopmann et al.
(Continued)

FOREIGN PATENT DOCUMENTS

CN  102741900 A  10/2012
CN  102789693 A  11/2012
(Continued)

OTHER PUBLICATIONS

Machine Translation and Abstract of Japanese Publication No. JP4762697, Aug. 31, 2011, 61 pages.
(Continued)

*Primary Examiner* — Hai Phan
*Assistant Examiner* — Anthony D Afrifa-Kyei
(74) *Attorney, Agent, or Firm* — Conley Rose, P.C.

(57) ABSTRACT

A traffic information update method includes recognizing, by a terminal, a first traffic sign from a road image; detecting whether traffic information of the terminal includes first alert information corresponding to the first traffic sign; if the traffic information of the terminal does not include the first alert information, generating a traffic sign adding instruction corresponding to the first traffic sign; and sending the traffic sign adding instruction to a server. After finding a new traffic sign, the terminal may report a content indication and a location indication of the traffic sign to the server such that the server can directly update traffic information according to the information reported by the terminal.

20 Claims, 3 Drawing Sheets

(51) Int. Cl.
  *G08G 1/0967* (2006.01)
  *G08G 1/01* (2006.01)
  *G01C 21/36* (2006.01)
(52) U.S. Cl.
  CPC ............. *G08G 1/04* (2013.01); *G08G 1/0967* (2013.01); *G08G 1/096716* (2013.01); *G08G 1/096741* (2013.01); *G08G 1/096766* (2013.01); *G08G 1/096775* (2013.01); *G08G 1/096791* (2013.01)
(58) Field of Classification Search
  CPC ............. G08G 1/096716; G08G 1/052; G08G 1/096725; G08G 1/096741; G08G 1/096791; G08G 3/00; G08G 1/096766; G08G 1/096775; G01C 21/3602; G01C 21/3697; G01C 21/3415; G01C 5/02; B60K 31/185; B60K 31/00; B60K 31/18; B60W 2555/60; B60W 2556/50
  See application file for complete search history.

(56) References Cited

U.S. PATENT DOCUMENTS

| | | | |
|---|---|---|---|
| 7,778,770 | B2 | 8/2010 | Sakagami et al. |
| 9,832,429 | B2 | 11/2017 | Seymour |
| 2004/0098361 | A1 | 5/2004 | Peng |
| 2009/0222806 | A1 | 9/2009 | Faus et al. |
| 2010/0256863 | A1* | 10/2010 | Nielsen ............... G06T 11/60 701/31.4 |
| 2012/0169834 | A1 | 7/2012 | Grigsby et al. |
| 2013/0033603 | A1* | 2/2013 | Suzuki ............ G08G 1/096775 348/148 |
| 2014/0026062 | A1 | 1/2014 | Proudfoot et al. |
| 2014/0067540 | A1 | 3/2014 | Williams et al. |
| 2014/0282476 | A1 | 9/2014 | Ciudad et al. |
| 2014/0304700 | A1 | 10/2014 | Kim et al. |
| 2014/0327772 | A1 | 11/2014 | Sahba |
| 2014/0341434 | A1 | 11/2014 | Lin et al. |
| 2016/0044558 | A1 | 2/2016 | Fukada et al. |
| 2016/0117923 | A1* | 4/2016 | Dannenbring ..... G08G 1/09623 340/905 |
| 2016/0188317 | A1 | 6/2016 | Hilliar et al. |
| 2019/0325235 | A1* | 10/2019 | Stenneth .............. G06K 9/6201 |

FOREIGN PATENT DOCUMENTS

| | | |
|---|---|---|
| CN | 104280036 A | 1/2015 |
| JP | 2007147521 A | 6/2007 |
| JP | 4762697 B2 | 8/2011 |
| WO | 2014148173 A1 | 9/2014 |

OTHER PUBLICATIONS

Machine Translation and Abstract of Chinese Publication No. CN102789693, Nov. 21, 2012, 9 pages.
Machine Translation and Abstract of Chinese Publication No. CN104280036, Jan. 14, 2015, 24 pages.
Machine Translation and Abstract of Japanese Publication No. JP2007147521, Jun. 14, 2007, 39 pages.
Foreign Communication From a Counterpart Application, Chinese Application No. 201580005121.8, Chinese Office Action dated Oct. 8, 2019, 5 pages.
Foreign Communication From a Counterpart Application, Chinese Application No. 201580005121.8, Chinese Office Action dated Jan. 11, 2019, 8 pages.
Foreign Communication From a Counterpart Application, PCT Application No. PCT/CN2015/080181, English Translation of International Search Report dated Mar. 7, 2016, 2 pages.
Foreign Communication From a Counterpart Application, PCT Application No. PCT/CN2015/080181, English Translation of Written Opinion dated Mar. 7, 2016, 6 pages.

* cited by examiner

TRAFFIC INFORMATION UPDATE METHOD AND APPARATUS

CROSS-REFERENCE TO RELATED APPLICATIONS

This application is a continuation of U.S. patent application Ser. No. 15/577,952 filed on Nov. 29, 2017, which is a national stage application of International Patent Application No. PCT/CN2015/080181 filed on May 29, 2015. All of the aforementioned applications are hereby incorporated by reference in their entireties.

TECHNICAL FIELD

The disclosure relates to the data processing field, and in particular, to a traffic information update method and apparatus.

BACKGROUND

With development of mobile terminal technologies, a navigation terminal that can provide services such as navigation, positioning, and route planning is more favored by motor vehicle drivers. In addition to navigation, positioning, and route planning functions, an existing navigation terminal generally has a traffic sign alert function. After the traffic sign alert function is enabled, when a vehicle approaches a traffic sign, the navigation terminal can alert a driver to the traffic sign, thereby improving driving safety.

To implement the traffic sign alert function of the navigation terminal, a manufacturer of the navigation terminal needs to pre-store a group of traffic information in the navigation terminal. The traffic information may include several pieces of alert information. Each piece of alert information corresponds to one traffic sign, and each piece of alert information may include content of multiple parts such as a location and content of the traffic sign corresponding to the alert information. After the traffic sign alert function is enabled, the navigation terminal may determine, according to a current location of the vehicle and locations that are included in the alert information and that are of traffic signs, whether there is a traffic sign within a pre-determined distance in a heading direction of the vehicle. If there is a traffic sign within the pre-determined distance in the heading direction of the vehicle, the navigation terminal may notify, in advance in an image or sound form, a driver of content of the traffic sign ahead, to alert the driver to the traffic sign ahead on a road.

It can be learned from above that, an implementation of the traffic sign alert function of the navigation terminal totally depends on the traffic information on the navigation terminal. However, during actual use, there are a large quantity of traffic signs that are widely distributed, and new traffic signs are set up one after another as time goes by. Therefore, the manufacturer of the navigation terminal usually needs to continually send technical personnel to collect location information and content information of the traffic signs, then manually update traffic information of a server according to the information collected by the technical personnel, and update traffic information of each terminal according to the traffic information of the server, to ensure timeliness and integrity of the traffic information of the server and the traffic information of the terminal. However, the practice of sending technical personnel to collect location information and content information of the traffic signs wastes human and material resources, and has poor timeliness.

SUMMARY

Embodiments of the disclosure provide a traffic information update method and apparatus, to resolve prior-art problems that traffic information update wastes human resources and has poor timeliness.

According to a first aspect, an embodiment of the disclosure provides a traffic information update method, where the method includes recognizing, by a terminal, a first traffic sign from a road image; detecting, by the terminal, whether traffic information of the terminal includes first alert information corresponding to the first traffic sign; if the traffic information of the terminal does not include the first alert information, generating, by the terminal, a traffic sign adding instruction corresponding to the first traffic sign; and sending, by the terminal, the traffic sign adding instruction to a server, where the traffic sign adding instruction is used to instruct the server to add second alert information corresponding to the first traffic sign to traffic information of the server.

With reference to the first aspect, in a first possible implementation of the first aspect, the detecting, by the terminal, whether traffic information of the terminal includes first alert information corresponding to the first traffic sign includes obtaining, by the terminal, a first location of the first traffic sign; obtaining, by the terminal, first content of the first traffic sign; detecting, by the terminal, whether there is alert information, corresponding to a traffic sign, at the first location in the traffic information of the terminal; and if there is no alert information at the first location in the traffic information of the terminal, determining, by the terminal, that the traffic information of the terminal does not include the first alert information corresponding to the first traffic sign; or if there is alert information at the first location in the traffic information of the terminal, detecting, by the terminal, whether the alert information at the first location includes the first content, and if the alert information at the first location does not include the first content, determining, by the terminal, that the traffic information of the terminal does not include the first alert information.

With reference to the first aspect, in a second possible implementation of the first aspect, the detecting, by the terminal, whether traffic information of the terminal includes first alert information corresponding to the first traffic sign includes obtaining, by the terminal, a first location and first content of the first traffic sign; detecting, by the terminal, whether the first alert information matching the first content exists at the first location in the traffic information of the terminal; and if the first alert information does not exist at the first location, determining, by the terminal, that the traffic information of the terminal does not include the first alert information corresponding to the first traffic sign.

With reference to the first possible implementation of the first aspect or the second possible implementation of the first aspect, in a third possible implementation of the first aspect, the generating, by the terminal, a traffic sign adding instruction corresponding to the first traffic sign includes generating, by the terminal, a traffic sign adding instruction that includes the first location and the first content.

With reference to the third possible implementation of the first aspect, in a fourth possible implementation of the first aspect, before the generating, by the terminal, a traffic sign adding instruction corresponding to the first traffic sign, the method further includes determining, by the terminal, a pointing direction of the first traffic sign; and the generating, by the terminal, a traffic sign adding instruction corresponding to the first traffic sign includes generating, by the terminal, a traffic sign adding instruction that includes the first location, the first content, and the pointing direction.

With reference to any one of the first aspect or the first to the fourth possible implementations of the first aspect, in a fifth possible implementation of the first aspect, the method further includes, if the traffic information of the terminal does not include the first alert information, generating, by the terminal, the first alert information; and adding, by the terminal, the first alert information to the traffic information of the terminal.

According to a second aspect, an embodiment of the disclosure further provides another traffic information update method, where the method includes receiving, by a server, a traffic sign adding instruction sent by a first terminal, where the traffic sign adding instruction is generated by the first terminal after the first terminal recognizes a first traffic sign from a road image, and is used to instruct the server to add second alert information corresponding to the first traffic sign to traffic information of the server; generating, by the server, the second alert information; adding, by the server, the second alert information to the traffic information of the server; and generating, by the server, update information according to traffic information that is of the server and that is obtained after the second alert information is added, to update traffic information of a second terminal.

With reference to the second aspect, in a first possible implementation of the second aspect, the generating, by the server, the second alert information includes determining, by the server, whether the traffic information of the server includes alert information corresponding to the first traffic sign; and when the traffic information of the server does not include the alert information corresponding to the first traffic sign, generating, by the server, the second alert information corresponding to the traffic sign adding instruction.

With reference to the second aspect, in a second possible implementation of the second aspect, the adding, by the server, the second alert information to the traffic information of the server includes determining, by the server, whether the traffic information of the server includes alert information corresponding to the first traffic sign; and when the traffic information of the server does not include the alert information corresponding to the first traffic sign, adding, by the server, the second alert information to the traffic information of the server.

With reference to the first possible implementation of the second aspect, in a third possible implementation of the second aspect, the generating, by the server, the second alert information corresponding to the traffic sign adding instruction includes, when the traffic sign adding instruction includes first content and a first location, generating, by the server, alert information that includes the first content and the first location.

With reference to the first possible implementation of the second aspect, in a fourth possible implementation of the second aspect, the generating, by the server, the second alert information corresponding to the traffic sign adding instruction includes, when the traffic sign adding instruction includes first content, a first location, and a pointing direction, generating, by the server, alert information that includes the first content, the first location, and the pointing direction.

According to a third aspect, an embodiment of the disclosure provides a traffic information update apparatus, where the apparatus includes a recognition unit configured to recognize a traffic sign from a road image; a detection unit configured to detect whether traffic information of the terminal includes first alert information corresponding to the first traffic sign; a generation unit configured to, when the traffic information of the terminal does not include the first alert information, generate a traffic sign adding instruction corresponding to the first traffic sign; and a sending unit configured to send the traffic sign adding instruction to a server, where the traffic sign adding instruction is used to instruct the server to add second alert information corresponding to the first traffic sign to traffic information of the server.

With reference to the third aspect, in a first possible implementation of the third aspect, the detection unit includes a first obtaining subunit configured to obtain a first location and first content of the first traffic sign; a detection subunit configured to detect whether there is alert information, corresponding to a traffic sign, at the first location in the traffic information of the terminal; and a first judging subunit configured to, when there is no alert information at the first location in the traffic information of the terminal, determine that the traffic information of the terminal does not include the first alert information corresponding to the first traffic sign, where the first detection subunit is further configured to, when there is alert information at the first location in the traffic information of the terminal, detect whether the alert information at the first location includes the first content; and the first judging subunit is further configured to, when the alert information at the first location does not include the first content, determine that the traffic information of the terminal does not include the first alert information.

With reference to the third aspect, in a second possible implementation of the third aspect, the detection unit includes a second obtaining subunit configured to obtain a first location and first content of the first traffic sign; a second detection subunit configured to detect whether the first alert information matching the first content exists at the first location in the traffic information of the terminal; and a second judging subunit configured to, when the first alert information does not exist at the first location, determine that the traffic information of the terminal does not include the first alert information corresponding to the first traffic sign.

With reference to the first possible implementation of the third aspect or the second possible implementation of the third aspect, in a third possible implementation of the third aspect, the generation unit is configured to generate a traffic sign adding instruction that includes the first location and the first content.

With reference to the third possible implementation of the third aspect, in a fourth possible implementation of the third aspect, the generation unit includes a determining subunit configured to determine a pointing direction of the first traffic sign; and a generation subunit configured to generate a traffic sign adding instruction that includes the first location, the first content, and the pointing direction.

With reference to any one of the third aspect or the first to the fourth possible implementations of the third aspect, in a fifth possible implementation of the third aspect, the apparatus further includes a new information generation unit configured to, if the traffic information of the terminal does not include the first alert information, generate the first alert information; and an adding unit configured to add the first alert information to the traffic information of the terminal.

According to a fourth aspect, an embodiment of the disclosure further provides another traffic information update apparatus, where the apparatus includes a receiving unit configured to receive a traffic sign adding instruction sent by a first terminal, where the traffic sign adding instruction is generated by the first terminal after the first terminal recognizes a first traffic sign from a road image, and is used to instruct a server to add second alert information corresponding to the first traffic sign to traffic information of the server; a generation unit configured to generate the second alert information; an adding unit configured to add the second alert information to the traffic information of the server; and an update unit configured to update traffic information of a second terminal according to traffic information that is of the server and that is obtained after the second alert information is added.

With reference to the fourth aspect, in a first possible implementation of the fourth aspect, the generation unit includes a first judging subunit configured to determine whether the traffic information of the server includes alert information corresponding to the first traffic sign; and a generation subunit configured to, when the traffic information of the server does not include the alert information corresponding to the first traffic sign, generate the second alert information corresponding to the traffic sign adding instruction.

With reference to the fourth aspect, in a second possible implementation of the fourth aspect, the adding unit includes a second judging subunit configured to determine whether the traffic information of the server includes alert information corresponding to the first traffic sign; and an adding subunit configured to, when the traffic information of the server does not include the alert information corresponding to the first traffic sign, add the second alert information to the traffic information of the server.

With reference to the first possible implementation of the fourth aspect, in a third possible implementation of the fourth aspect, the generation subunit is configured to, when the traffic sign adding instruction includes first content and a first location, generate alert information that includes the first content and the first location.

With reference to the first possible implementation of the fourth aspect, in a fourth possible implementation of the fourth aspect, the generation subunit is configured to, when the traffic sign adding instruction includes first content, a first location, and a pointing direction, generate alert information that includes the first content, the first location, and the pointing direction.

According to a fifth aspect, an embodiment of the disclosure further provides a terminal, where the terminal includes a processor, an input unit, a communications unit, and a memory, and the processor, the input unit, the communications unit, and the memory communicate with each other by using a bus; the input unit is configured to obtain a road image; the memory is configured to store traffic information of the terminal; the processor unit is configured to recognize a first traffic sign from the road image; detect whether the traffic information of the terminal includes first alert information corresponding to the first traffic sign; and when the traffic information of the terminal does not include the first alert information, generate a traffic sign adding instruction corresponding to the first traffic sign; and the communications unit is configured to send the traffic sign adding instruction to a server, where the traffic sign adding instruction is used to instruct the server to add second alert information corresponding to the first traffic sign to traffic information of the server.

With reference to the fifth aspect, in a first possible implementation of the fifth aspect, the processor is further configured to obtain a first location of the first traffic sign; obtain first content of the first traffic sign; detect, by the terminal, whether there is alert information, corresponding to a traffic sign, at the first location in the traffic information of the terminal; and if there is no alert information at the first location in the traffic information of the terminal, determine that the traffic information of the terminal does not include the first alert information corresponding to the first traffic sign; or if there is alert information at the first location in the traffic information of the terminal, detect whether the alert information at the first location includes the first content, and if the alert information at the first location does not include the first content, determine that the traffic information of the terminal does not include the first alert information.

With reference to the fifth aspect, in a second possible implementation of the fifth aspect, the processor is further configured to obtain a first location and first content of the first traffic sign; detect whether the first alert information matching the first content exists at the first location in the traffic information of the terminal; and if the first alert information does not exist at the first location, determine that the traffic information of the terminal does not include the first alert information corresponding to the first traffic sign.

According to a sixth aspect, an embodiment of the disclosure further provides a traffic information update server, where the server includes a processor, a communications unit, and a memory, and the processor, the communications unit, and the memory communicate with each other by using a bus; the memory is configured to store traffic information; the communications unit is configured to receive a traffic sign adding instruction sent by a first terminal, where the traffic sign adding instruction is generated by the first terminal after the first terminal recognizes a first traffic sign from a road image, and is used to instruct the server to add second alert information corresponding to the first traffic sign to the traffic information of the server; and the processor is configured to generate the second alert information; add the second alert information to the traffic information of the server; and generate update information according to traffic information that is of the server and that is obtained after the second alert information is added, to update traffic information of a second terminal.

With reference to the sixth aspect, in a first possible implementation of the sixth aspect, the processor is further configured to determine whether the traffic information of the server includes alert information corresponding to the first traffic sign; and when the traffic information of the server does not include the alert information corresponding to the first traffic sign, generate the second alert information corresponding to the traffic sign adding instruction.

With reference to the sixth aspect or the first possible implementation of the sixth aspect, in a second possible implementation of the sixth aspect, the processor is further configured to, when the traffic sign adding instruction includes first content and a first location, generate alert information that includes the first content and the first location.

With reference to the sixth aspect or the first possible implementation of the sixth aspect, in a third possible implementation of the sixth aspect, the processor is further configured to, when the traffic sign adding instruction includes first content, a first location, and a pointing direction, generate alert information that includes the first content, the first location, and the pointing direction.

In the embodiments of the disclosure, the terminal recognizes the first traffic sign from the road image; detects whether the traffic information of the terminal includes the first alert information corresponding to the first traffic sign;

if the traffic information of the terminal does not include the first alert information, generates the traffic sign adding instruction corresponding to the first traffic sign; and sends the traffic sign adding instruction to the server, where the traffic sign adding instruction is used to instruct the server to add the second alert information corresponding to the first traffic sign to the traffic information of the server. By using the embodiments of the disclosure, after finding a new traffic sign, the terminal may report a content indication and a location indication of the traffic sign to the server, so that the server can directly update the traffic information according to the information reported by the terminal, thereby avoiding waste of human and material resources, and improving timeliness in updating the traffic information of the server.

BRIEF DESCRIPTION OF THE DRAWINGS

To describe the technical solutions in the embodiments of the disclosure more clearly, the following describes the accompanying drawings required for describing the embodiments. A person of ordinary skill in the art may still derive other drawings from these accompanying drawings without creative efforts.

DESCRIPTION OF EMBODIMENTS

To make a person skilled in the art better understand the solutions in the disclosure, the following clearly describes the technical solutions in the embodiments of the disclosure with reference to accompanying drawings in the embodiments of the disclosure. The described embodiments are merely some rather than all of the embodiments of the disclosure. All other embodiments obtained by a person of ordinary skill in the art based on the embodiments of the disclosure without creative efforts shall fall within the protection scope of the disclosure.

In the embodiments of the disclosure, a location indication may be generally a longitude and latitude coordinate point, or may be a longitude and latitude coordinate range, or may be relative coordinates or a coordinate range obtained by using a reference point as a coordinate origin.

In the embodiments of the disclosure, traffic information is stored in a terminal or a server, to provide, for a user, navigation-related information such as a road guide or a traffic alert. For example, a user departs from a place A to a place B, and a terminal in which traffic information is stored or installed may prompt, when the user drives on a road C, the user to turn from an intersection D to a road E to reach the place B. When the user drives on the road C, the terminal may prompt the user to control a driving speed to be lower than 80, because there is a speed limit sign on the road that indicates a speed limit of 80. The traffic information may be stored in the terminal or the server in a database form, or may be stored in another form. This is not limited in the disclosure.

Figure 1:
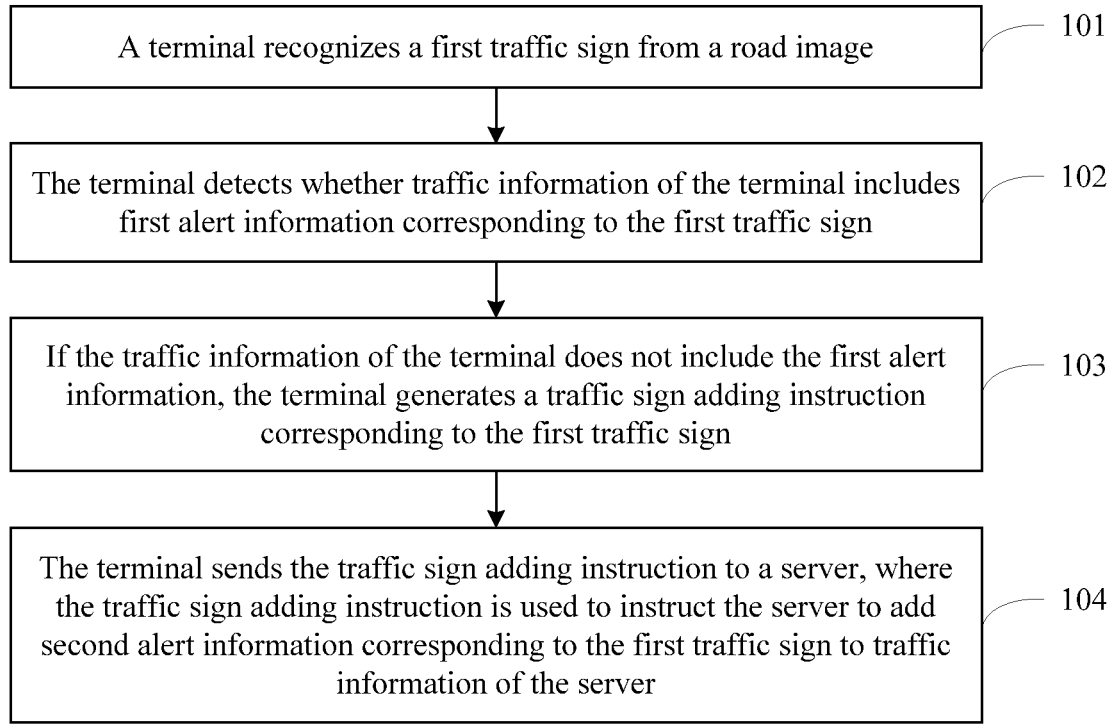
FIG. 1 is a schematic flowchart of an embodiment of a traffic information update method according to the disclosure.

Referring to FIG. 1, FIG. 1 is a flowchart of an embodiment of a traffic information update method according to the disclosure. The method shown in this embodiment may be performed by a terminal disposed on a vehicle. The terminal may include a professional navigation terminal such as a driving safety alert device, a navigator, or an in-vehicle head up display (HUD), or may include a mobile terminal that can implement a navigation or driving safety alert function, such as a mobile phone or a tablet computer.

Step 101. The terminal recognizes a first traffic sign from a road image.

When the terminal has a real-time image obtaining function, the terminal can independently obtain the road image. When the terminal does not have the real-time image obtaining function, the terminal may obtain the road image from another device. Generally, the road image is also referred to as a road condition image, and is an image obtained by an image capture apparatus by photographing a road surface of a road and regions on two sides of the road.

When the terminal is a device that has the image obtaining function, such as a mobile phone, the terminal may obtain the road image by using a camera of the terminal. When the terminal is a device that does not have the image obtaining function, such as a navigator, the terminal may obtain the road image from another device such as an event data recorder mounted on a vehicle. When the terminal can obtain the road image in multiple manners, the terminal may select one of the manners according to a preset condition to obtain the road image, or may obtain road images in the multiple manners at the same time.

During actual use, the terminal may be fastened to the vehicle, and continuously obtain road images during vehicle driving. The road image may be a picture or may be a video. The first traffic sign is a traffic sign included in the road image. When the road image is a real-time image, the terminal may obtain the road image and recognize the first traffic sign from the road image at the same time, so as to recognize the first traffic sign from the real-time road image in real time.

For a specific manner of recognizing the first traffic sign from the road image by the terminal, refer to an existing image recognition technology. Details are not described herein.

Step 102. The terminal detects whether traffic information of the terminal includes first alert information corresponding to the first traffic sign.

After recognizing the first traffic sign from the road image, the terminal may obtain first content and a first location of the first traffic sign, and then determine, based on an exact match, whether the traffic information includes alert information corresponding to the traffic sign.

In an embodiment, the terminal first obtains the first location and the first content of the first traffic sign; then detects whether the first alert information matching the first content exists at the first location in the traffic information of the terminal. If the first alert information does not exist at the first location, the terminal determines that the traffic information of the terminal does not include the first alert information corresponding to the first traffic sign.

For example, when the first traffic sign is a speed limit sign board that indicates a speed limit of 80, the terminal may obtain first content "speed limit 80" and a first location "longitude and latitude coordinates (A, B)"; and then query whether alert information corresponding to the traffic sign whose longitude and latitude coordinates are (A, B) and whose content indication is "speed limit 80" exists in the traffic information of the terminal. If the alert information does not exist, the terminal may determine that the traffic information of the terminal does not include the alert information corresponding to the first traffic sign. When the road image is an image obtained by the terminal in real time during vehicle driving, the longitude and latitude coordinates (A, B) of the speed limit sign board may be current longitude and latitude coordinates of the terminal, or may be longitude and latitude coordinates calculated according to the current longitude and latitude coordinates of the terminal.

To accelerate a detection speed, the terminal may determine, by means of detection in stages, whether the traffic information includes the alert information corresponding to the traffic sign.

In an embodiment, the terminal obtains the first location of the first traffic sign. The terminal obtains the first content of the first traffic sign. The terminal detects whether there is alert information, corresponding to a traffic sign, at the first location in the traffic information of the terminal. If there is no alert information at the first location in the traffic information of the terminal, the terminal determines that the traffic information of the terminal does not include the first alert information corresponding to the first traffic sign. If there is alert information at the first location in the traffic information of the terminal, the terminal detects whether the alert information at the first location includes the first content. If the alert information at the first location does not include the first content, the terminal determines that the traffic information of the terminal does not include the first alert information. The terminal may simultaneously obtain the first location and the first content, or may obtain the first content after determining that there is alert information at the first location of the traffic information. This is not limited in the disclosure.

For example, when the first traffic sign is the speed limit sign board that indicates the speed limit of 80, the terminal may first obtain the first location "longitude and latitude coordinates (A, B)", and then query whether alert information corresponding to the traffic sign whose longitude and latitude coordinates are (A, B) exists in the traffic information of the terminal. If the alert information corresponding to the traffic sign whose longitude and latitude coordinates are (A, B) does not exist, the terminal may directly determine that the traffic information of the terminal does not include the alert information corresponding to the first traffic sign. If the alert information corresponding to the traffic sign whose longitude and latitude coordinates are (A, B) exists, the terminal may further obtain the first content "speed limit 80", and further determine whether the alert information corresponding to the traffic sign whose longitude and latitude coordinates are (A, B) includes alert information whose content is the speed limit of 80. If the alert information does not exist, the terminal may determine that the traffic information of the terminal does not include the alert information corresponding to the first traffic sign. If the alert information exists, the terminal may determine that the traffic information of the terminal includes the alert information corresponding to the first traffic sign.

Step 103. If the traffic information of the terminal does not include the first alert information, the terminal generates a traffic sign adding instruction corresponding to the first traffic sign.

If the terminal finds, by means of detection, that the traffic information of the terminal does not include the first alert information, the terminal may generate a traffic sign adding instruction that includes the first location and the first content.

Because the traffic sign is directional, different traffic signs may be set up for different driving directions on a same road. For example, in some special road sections, a same highway has different speed limits in different directions. Therefore, different speed limit signs are set up for the different directions. To make the alert information more accurate, before the terminal generates a traffic sign adding instruction corresponding to the first traffic sign, the method further includes determining, by the terminal, a pointing direction of the first traffic sign. That the terminal generates a traffic sign adding instruction corresponding to the first traffic sign includes generating, by the terminal, a traffic sign adding instruction that includes the first location, the first content, and the pointing direction. The pointing direction is used to indicate a direction to which the first traffic sign points. The terminal and a server may determine the pointing direction of the first traffic sign according to the pointing direction. The pointing direction of the first traffic sign may be an absolute direction to which the traffic sign points, for example, a northeast direction or a due south direction; or may be a relative direction that is relative to a current vehicle driving direction, for example, a relative direction such as a right ahead direction of the current vehicle driving direction.

For example, when the first location is the longitude and latitude coordinates (A, B) and the first content is the "speed limit 80", if the traffic information of the terminal does not include the alert information corresponding to the first traffic sign, the terminal may generate a traffic sign adding instruction. The traffic sign adding instruction may include the longitude and latitude coordinates (A, B) and the "speed limit 80". When the terminal determines that the pointing direction of the first traffic sign is a north direction, the traffic sign adding instruction may further include the pointing direction "north direction".

Step 104. The terminal sends the traffic sign adding instruction to a server, where the traffic sign adding instruction is used to instruct the server to add second alert information corresponding to the first traffic sign to traffic information of the server.

After generating traffic sign adding information, the terminal may send the traffic sign adding instruction to the traffic information update server. After receiving the traffic sign adding instruction, the server adds, to the traffic information of the server, the alert information that is corresponding to the traffic sign and that is newly added by the server, so as to update the traffic information of the server.

By using this embodiment, after finding a new traffic sign, the terminal may report a content indication and a location indication of the traffic sign to the server, so that the server can directly update the traffic information according to the information reported by the terminal, thereby avoiding problems of waste of human and material resources and poor timeliness that are caused when the traffic information of the server is updated according to information collected by technical personnel.

Figure 2:
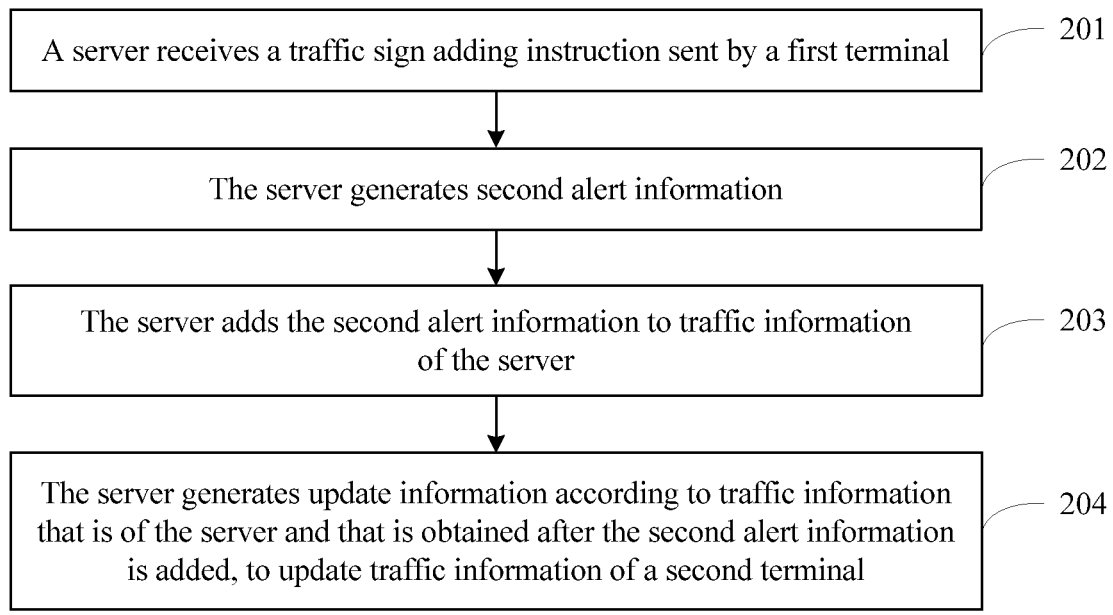
FIG. 2 is a schematic flowchart of another embodiment of a traffic information update method according to the disclosure.

Referring to FIG. 2, FIG. 2 is a flowchart of an embodiment of a traffic information update method according to the disclosure. The method shown in this embodiment may be performed by a server.

Step 201. The server receives a traffic sign adding instruction sent by a first terminal, where the traffic sign adding instruction is generated by the first terminal after the first terminal recognizes a first traffic sign from a road image, and is used to instruct the server to add second alert information corresponding to the first traffic sign to traffic information of the server.

The server first receives the traffic sign adding instruction sent by the first terminal. The traffic sign adding instruction may include first content and a first location of the first traffic sign. In addition, the traffic sign adding instruction may further include a pointing direction. The pointing direction is used to indicate a direction to which the first traffic sign points. For content included in the traffic sign adding instruction and a manner of generating the traffic sign adding instruction, refer to the foregoing embodiment. Details are not described herein again.

Step 202. The server generates the second alert information corresponding to the traffic sign adding instruction.

After receiving the traffic sign adding instruction, the server may directly generate the second alert information corresponding to the traffic sign adding instruction. To avoid repeatedly adding same alert information, the server determines whether the traffic information of the server includes alert information corresponding to the first traffic sign. Only when the traffic information of the server does not include the alert information corresponding to the first traffic sign, the server generates the second alert information corresponding to the traffic sign adding instruction.

After receiving the traffic sign adding instruction, the server may first obtain the first location and the first content in the traffic sign adding instruction, and then detect whether first alert information matching the first content exists at the first location of the traffic information of the server. If the first alert information does not exist at the first location, the server may determine that the traffic information of the terminal does not include the first alert information corresponding to the first traffic sign.

Alternatively, after receiving the traffic sign adding instruction, the server may obtain the first location and the first content of the first traffic sign, and then detect whether there is alert information, corresponding to a traffic sign, at the first location of the traffic information of the server. If there is no alert information at the first location of the traffic information of the server, the server may determine that the traffic information of the server does not include the first alert information corresponding to the first traffic sign. If there is alert information at the first location of the traffic information of the server, the server may further detect whether the alert information at the first location includes the first content. If the alert information at the first location does not include the first content, the server determines that the traffic information of the server does not include the first alert information.

A specific manner of detecting, by the server, whether the traffic information of the server includes the first alert information is similar to a specific manner of detecting, by the terminal, whether traffic information of the terminal includes the first alert information. For the specific manner, refer to a corresponding description in the foregoing embodiment. Details are not described herein again.

According to different content included in the traffic sign adding instruction, the second alert information includes different content accordingly. When the traffic sign adding instruction includes the first content and the first location, the server generates alert information that includes the first content and the first location. When the traffic sign adding instruction includes the first content, the first location, and the pointing direction, the server generates alert information that includes the first content, the first location, and the pointing direction.

Step 203. Add, to the original traffic information of the server, sign information newly added by the server, to obtain traffic information of the server.

After generating the second alert information, the server may directly add, to the original traffic information of the server, the sign information newly added by the server. To avoid repeatedly adding same alert information, the server may first determine whether the original traffic information of the server includes alert information corresponding to the to-be-added traffic sign. Only when the original traffic information of the server does not include the alert information corresponding to the traffic sign, the sign information newly added by the server is added to the original traffic information of the server. For a specific manner of determining whether the original traffic information of the server includes alert information corresponding to the to-be-added traffic sign, refer to the foregoing description. Details are not described herein again.

Step 204. The server generates update information according to the traffic information that is of the server and that is obtained after the second alert information is added, to update traffic information of a second terminal.

After the traffic information of the server is obtained after the original traffic information of the server is updated, the server may further update the traffic information on the second terminal. The second terminal may be the first terminal, or may be another terminal different from the first terminal.

Alternatively, the server may not perform step 204. After adding the second alert information, the server may notify the second terminal that there is an updated version of the traffic information, and a user may choose to perform an update or not. Alternatively, the server may not notify the second terminal, and a user of the second terminal may learn whether there is an updated version of the traffic information, and then download the updated version on line for update or directly go to a manufacturer providing the traffic information or another place storing the traffic information for manual update.

After adding the second alert information to the traffic information, the server may send the traffic information of the server to the second terminal, and instruct the second terminal to replace the original traffic information on the second terminal with the traffic information sent by the server, so as to update the traffic information on the second terminal.

The traffic information of the server usually has a relatively large amount of data, and much time needs to be consumed to send the entire traffic information of the server to the second terminal. In addition, there is usually only a little different data between the traffic information of the server and the original traffic information of the second terminal. Therefore, to reduce the time consumed for update, the server may determine incremental alert information when a pre-determined update condition is met. The incremental alert information is alert information that is included in the traffic information of the server but that is not included in the traffic information of the second terminal. Then, the incremental alert information is sent to the second terminal, so that the second terminal adds the incremental alert information to the traffic information of the second terminal.

In an embodiment, after the second terminal establishes a network connection to the server, the server may first detect alert information included in the traffic information of the second terminal; then compare the alert information included in the traffic information of the second terminal with that included in the traffic information of the server, to determine the incremental alert information; and then send the incremental alert information to the second terminal. After receiving the incremental alert information, the second terminal may add the incremental alert information to the traffic information of the second terminal, so as to update the traffic information of the second terminal.

For example, when determining, by means of detection, that the traffic information of the server includes 10 pieces of alert information with numbers 1 to 10 and the traffic information on the second terminal includes only eight pieces of alert information with numbers 1 to 8, the server determines that alert information with numbers 9 and 10 is incremental alert information. The server may send only the alert information with numbers 9 and 10 to the second terminal. After receiving the alert information with numbers 9 and 10, the second terminal adds the two pieces of alert information to the traffic information stored in the second terminal, so as to update the traffic information of the second terminal.

By using this embodiment, the server can directly update the traffic information according to the information reported by the terminal, thereby avoiding problems of waste of human and material resources and poor timeliness that are caused when the traffic information of the server is updated according to information collected by technical personnel.

Figure 3:
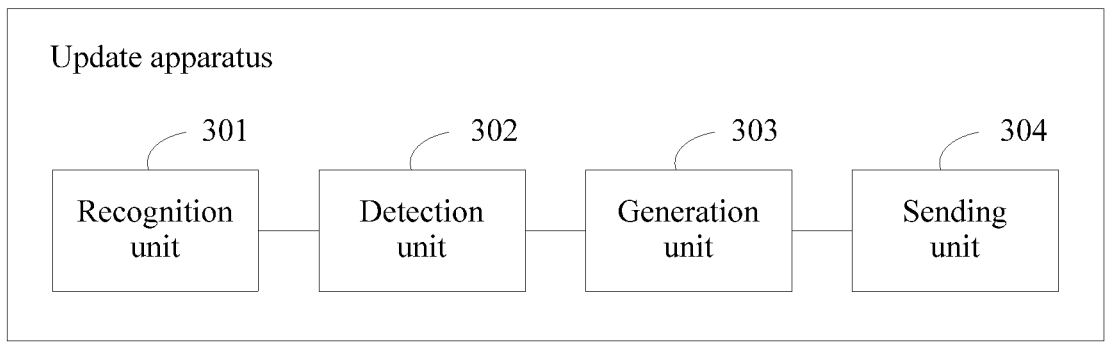
FIG. 3 is a schematic structural diagram of an embodiment of a traffic information update apparatus according to the disclosure.

Referring to FIG. 3, FIG. 3 is a schematic structural diagram of an embodiment of a traffic information update apparatus according to the disclosure. The apparatus may be disposed on a terminal, and is configured to perform the traffic information update method shown in FIG. 1.

As shown in FIG. 3, the apparatus may include a recognition unit 301, a detection unit 302, a generation unit 303, and a sending unit 304.

The recognition unit 301 is configured to recognize a traffic sign from a road image. The detection unit 302 is configured to detect whether traffic information of the terminal includes first alert information corresponding to the first traffic sign. The generation unit 303 is configured to, when the traffic information of the terminal does not include the first alert information, generate a traffic sign adding instruction corresponding to the first traffic sign. The sending unit 304 is configured to send the traffic sign adding instruction to a server. The traffic sign adding instruction is used to instruct the server to add second alert information corresponding to the first traffic sign to traffic information of the server.

Optionally, the detection unit 302 may include a first obtaining subunit configured to obtain a first location and first content of the first traffic sign; a detection subunit configured to detect whether there is alert information, corresponding to a traffic sign, at the first location in the traffic information of the terminal; and a first judging subunit configured to, when there is no alert information at the first location in the traffic information of the terminal, determine that the traffic information of the terminal does not include the first alert information corresponding to the first traffic sign. The first detection subunit is further configured to, when there is alert information at the first location in the traffic information of the terminal, detect whether the alert information at the first location includes the first content. The first judging subunit is further configured to, when the alert information at the first location does not include the first content, determine that the traffic information of the terminal does not include the first alert information.

Alternatively, the detection unit 302 may include a second obtaining subunit configured to obtain a first location and first content of the first traffic sign; a second detection subunit configured to detect whether the first alert information matching the first content exists at the first location in the traffic information of the terminal; and a second judging subunit configured to, when the first alert information does not exist at the first location, determine that the traffic information of the terminal does not include the first alert information corresponding to the first traffic sign.

Optionally, the generation unit 303 is configured to generate a traffic sign adding instruction that includes the first location and the first content.

Alternatively, the generation unit 303 may include a determining subunit configured to determine a pointing direction of the first traffic sign; and a generation subunit configured to generate a traffic sign adding instruction that includes the first location, the first content, and the pointing direction.

Optionally, the apparatus may further include a new information generation unit configured to, if the traffic information of the terminal does not include the first alert information, generate the first alert information; and an adding unit configured to add the first alert information to the traffic information of the terminal.

By using this embodiment, after finding a new traffic sign, the traffic information update apparatus may report a content indication and a location indication of the traffic sign to the server, so that the server can directly update the traffic information according to the information reported by the terminal, thereby avoiding problems of waste of human and material resources and poor timeliness that are caused when the traffic information of the server is updated according to information collected by technical personnel.

Figure 4:
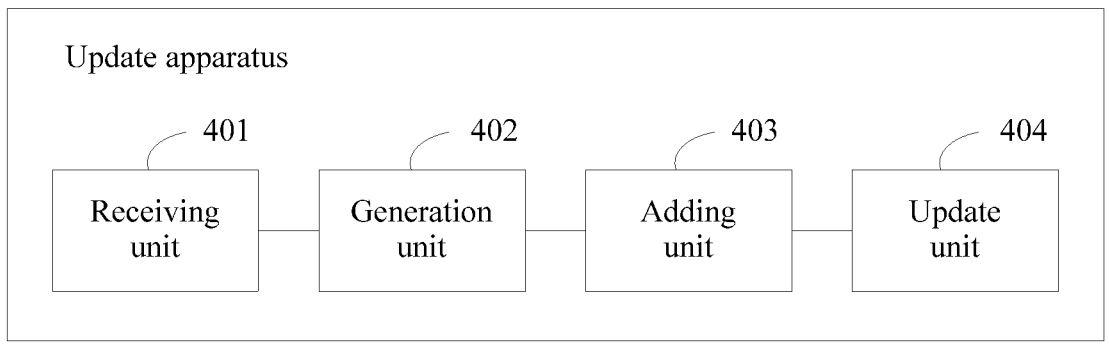
FIG. 4 is a schematic structural diagram of another embodiment of a traffic information update apparatus according to the disclosure.

Referring to FIG. 4, FIG. 4 is a schematic structural diagram of an embodiment of a traffic information update apparatus according to the disclosure. The apparatus may be disposed on a server, and is configured to perform the traffic information update method shown in FIG. 2.

As shown in FIG. 4, the apparatus may include a receiving unit 401, a generation unit 402, an adding unit 403, and an update unit 404.

The receiving unit 401 is configured to receive a traffic sign adding instruction sent by a first terminal. The traffic sign adding instruction is generated by the first terminal after the first terminal recognizes a first traffic sign from a road image, and is used to instruct the server to add second alert information corresponding to the first traffic sign to traffic information of the server. The generation unit 402 is configured to generate the second alert information. The adding unit 403 is configured to add the second alert information to the traffic information of the server. The update unit 404 is configured to generate update information according to traffic information that is of the server and that is obtained after the second alert information is added, to update traffic information of a second terminal.

Optionally, the generation unit 402 includes a first judging subunit configured to determine whether the traffic information of the server includes alert information corresponding to the first traffic sign; and a generation subunit configured to, when the traffic information of the server does not include the alert information corresponding to the first traffic sign, generate the second alert information corresponding to the traffic sign adding instruction. The generation subunit may be configured to, when the traffic sign adding instruction includes first content and a first location, generate alert information that includes the first content and the first location. Alternatively, the generation subunit may be configured to, when the traffic sign adding instruction includes first content, a first location, and a pointing direction, generate alert information that includes the first content, the first location, and the pointing direction.

Optionally, the adding unit 403 includes a second judging subunit configured to determine whether the traffic information of the server includes alert information corresponding to the first traffic sign; and an adding subunit configured to, when the traffic information of the server does not include the alert information corresponding to the first traffic sign, add the second alert information to the traffic information of the server.

Optionally, the update unit 404 includes an incremental information determining subunit configured to determine incremental alert information, where the incremental alert information is alert information that is included in the traffic information of the server but that is not included in the traffic information of the second terminal; and an incremental information sending subunit configured to send the incremental alert information to the second terminal, so that the second terminal adds the incremental alert information to the traffic information of the second terminal.

By using this embodiment, the traffic information update apparatus can directly update the traffic information according to the information reported by the terminal, thereby avoiding problems of waste of human and material resources and poor timeliness that are caused when the traffic information of the server is updated according to information collected by technical personnel.

Figure 5:
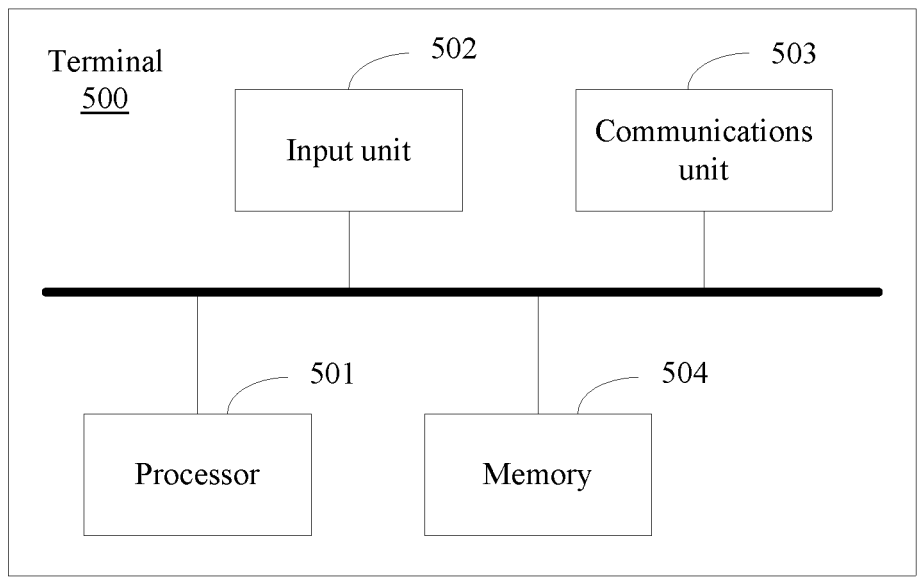
FIG. 5 is a schematic structural diagram of an embodiment of a terminal according to the disclosure.

Referring to FIG. 5, FIG. 5 is a schematic structural diagram of an embodiment of a terminal according to the embodiments of the disclosure. The terminal may be configured to perform the traffic information update method shown in FIG. 1.

As shown in FIG. 5, the terminal 500 includes a processor 501, an input unit 502, a communications unit 503, and a memory 504. These components communicate with each other by using one or more buses. A person skilled in the art may understand that a structure of the terminal shown in the figure does not constitute a limitation on the disclosure. The terminal may be in a bus type structure, or may be in a star type structure, and may include more or fewer parts than those shown in the figure, or some parts may be combined, or a different part deployment may be used.

The input unit 502 is configured to implement interaction between a user and the terminal and/or input information to the terminal. For example, the input unit 502 may obtain a road image, and may further receive digit or character information entered by the user, and generate signal input related to user setting and functional control. In a specific implementation of the disclosure, the input unit 502 may include an apparatus for obtaining external information, for example, a camera configured to independently obtain the road image. Alternatively, the apparatus for obtaining external information does not include the camera, and the input unit 502 is configured to obtain the road image from another device. The input unit 502 may further include a touch panel, or may include another human-computer interaction interface, for example, a physical input key or a microphone.

The processor 501 is a control center of the terminal, is connected to all parts of the entire terminal by using various interfaces and lines, and performs various functions of the terminal and/or data processing by running or executing a software program and/or a module that are/is stored in the memory 504 and invoking data stored in the memory 504. The processor 501 may include an integrated circuit (IC), for example, may include a single packaged IC, or may include multiple packaged ICs that are connected and that have a same function or different functions. For example, the processor 501 may include only a central processing unit (CPU), or may be a combination of a graphics processor unit (GPU), a digital signal processor (DSP), and a control chip (for example, a baseband chip) in the communications unit 503. In an implementation of the disclosure, the CPU may include a single computing core, or may include multiple computing cores.

The communications unit 503 is configured to establish a communication channel, so that the terminal is connected to a remote server by using the communication channel, and the remote server can send data to the terminal or the terminal can download media data from the remote server. The communications unit 503 may include communications modules such as a wireless local area network (wireless LAN) module, a Bluetooth module, and a baseband module; and a radio frequency (RF) circuit that is corresponding to the communications modules and that is configured to perform wireless local area network communication, Bluetooth communication, infrared communication, and/or cellular communications system communication, for example, Wideband Code Division Multiple Access (W-CDMA) and/or High Speed Downlink Packet Access (HSDPA). The communications modules are configured to control communication of the components in the terminal, and can support direct memory access (DMA).

In different implementations of the disclosure, the communications modules in the communications unit 503 generally appear in a form of an IC Chip, and may be selectively combined, and not all of the communications modules and corresponding antenna groups are necessarily included. For example, the communications unit 503 may include only a baseband chip, a radio frequency chip, and a corresponding antenna, to provide a communication function in a cellular communications system. The terminal may be connected to a cellular network) or the Internet by using a wireless communication connection established by the communications unit 503, for example, by means of wireless LAN or WCDMA access. In some optional implementations of the disclosure, the communications module, for example, the baseband module, in the communications unit 503 may be integrated into the processor 501, and a typical example is an APQ+MDM series platform provided by the Qualcomm® company.

The radio frequency circuit is configured to receive and send signals during an information transceiving process or during a call. For example, after the radio frequency circuit receives downlink information from a base station, the processor 501 processes the downlink information. In addition, the radio frequency circuit sends related uplink data to the base station. Generally, the radio frequency circuit includes a known circuit for performing these functions, including but not limited to an antenna system, a radio frequency transceiver, one or more amplifiers, a tuner, one or more oscillators, a DSP, a codec chip set, a subscriber identity module (SIM), a memory, and the like. In addition, the RF circuit may further communicate with a network and another device by means of wireless communication. The wireless communication may use any communication standard or protocol, including but not limited to a, Global System for Mobile Communications (GSM), a General Packet Radio Service (GPRS), Code Division Multiple Access (CDMA), WCDMA, a High Speed Uplink Packet Access (HSUPA) technology, Long Term Evolution (LTE), an email, a Short Message Service (SMS), and the like.

The memory 504 may be configured to store the software program and the module. The processor 501 performs various functional applications of the terminal and implements data processing by running the software program and the module that are stored in the memory 504. The memory 504 mainly includes a program storage area and a data storage area. The program storage area may store an operating system and an application program, such as a sound play program or an image display program that is required by at least one function. The data storage area may store data (such as audio data and an address book) created according to use of the terminal and the like. In a specific implementation of the disclosure, the memory 504 may include a volatile memory, for example, a nonvolatile random access memory (NVRAM), a phase change random access memory (PRAM), or a magnetoresistive random access memory (MRAM), and may further include a nonvolatile memory, for example, at least one magnetic disk storage device, an electrically erasable programmable read-only memory (EE-PROM), or a flash memory device, such as a negative-OR (NOR) flash memory or a negative-AND (NAND) flash memory. The nonvolatile memory stores the operating system and the application program that are executed by the processor. The processor loads, from the nonvolatile memory, a running program and data to a memory, and stores digital content in a massive storage apparatus. The operating system includes various components and/or drives that are configured to control and manage conventional system tasks, such as memory management, storage device control, and management of a power supply 507, and are helpful for communication between various types of software and hardware. In an implementation of the disclosure, the operating system may be an Android system of the Google® company, an iOS system developed by the Apple® company, or a Windows® operating system developed by the Microsoft® company, or an embedded operating system such as Vxworks®.

Optionally, the terminal may further include an output unit. The output unit includes but is not limited to an image output unit and a sound output unit. The image output unit is configured to output a text, a picture, and/or a video. The image output unit may include a display panel, for example, a display panel configured in a form of an Liquid Crystal Display (LCD), an Organic Light-Emitting Diode (OLED), a field emission display (FED), or the like. Alternatively, the image output unit may include a reflective display, for example, an electrophoretic display, or a display for which an interferometric modulation of light technology is used. The image output unit may include a single display or multiple displays in different sizes. In a specific implementation of the disclosure, the touch panel used in the input unit 502 may also be used as the display panel of the output unit. For example, after detecting a touch operation on the touch panel or a gesture operation near the touch panel, the touch panel transfers the operation to the processor, to determine a type of a touch event. Then, the processor provides corresponding visual output on the display panel according to the type of the touch event. Although in FIG. 1, the input unit 502 and the output unit are used as two separate parts to implement input and output functions of the terminal, in some embodiments, the touch panel and the display panel may be integrated to implement the input and output functions of the terminal. For example, the image output unit may display various graphical user interfaces (GUI) as virtual control components, including but not limited to a window, a scroll bar, an icon, and a clipboard, so that the user performs operation in a touch manner. In this embodiment of the disclosure, the sound output unit may include a digital-to-analog converter, a speaker, and the like, and may be configured to output alert information in traffic information.

In this embodiment of the disclosure, the input unit 502 is configured to obtain the road image.

The processor 501 is configured to recognize a first traffic sign from the road image; detect whether traffic information of the terminal includes first alert information corresponding to the first traffic sign; and when the traffic information of the terminal does not include the first alert information, generate a traffic sign adding instruction corresponding to the first traffic sign.

The communications unit 502 is configured to send the traffic sign adding instruction to a server. The traffic sign adding instruction is used to instruct the server to add second alert information corresponding to the first traffic sign to traffic information of the server.

Optionally, the processor 501 may be further configured to obtain a first location of the first traffic sign; obtain first content of the first traffic sign; detect, by the terminal, whether there is alert information, corresponding to a traffic sign, at the first location in the traffic information of the terminal; and if there is no alert information at the first location in the traffic information of the terminal, determine that the traffic information of the terminal does not include the first alert information corresponding to the first traffic sign; or if there is alert information at the first location in the traffic information of the terminal, detect whether the alert information at the first location includes the first content, and if the alert information at the first location does not include the first content, determine that the traffic information of the terminal does not include the first alert information.

Optionally, the processor 501 is further configured to obtain a first location and first content of the first traffic sign; detect whether the first alert information matching the first content exists at the first location in the traffic information of the terminal; and if the first alert information does not exist at the first location, determine that the traffic information of the terminal does not include the first alert information corresponding to the first traffic sign.

Optionally, the processor 501 is further configured to generate a traffic sign adding instruction that includes the first location and the first content.

Optionally, the processor 501 is further configured to determine a pointing direction of the first traffic sign; and generate a traffic sign adding instruction that includes the first location, the first content, and the pointing direction.

Optionally, the processor 501 is further configured to, when the traffic information of the terminal does not include the first alert information, generate the first alert information; and add, by the terminal, the first alert information to the traffic information of the terminal.

By using this embodiment, after finding a new traffic sign, the terminal may report a content indication and a location indication of the traffic sign to the server, so that the server can directly update the traffic information according to the information reported by the terminal, thereby avoiding problems of waste of human and material resources and poor timeliness that are caused when the traffic information of the server is updated according to information collected by technical personnel.

Figure 6:
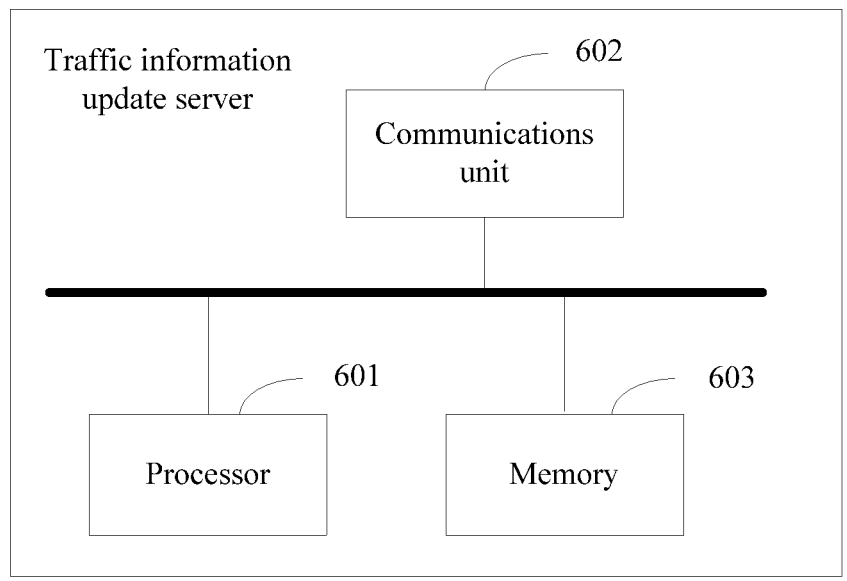
FIG. 6 is a flowchart of an embodiment of a traffic information update server according to the disclosure.

Referring to FIG. 6, FIG. 6 is a schematic structural diagram of an embodiment of a traffic information update server according to the disclosure. The server may be configured to perform the traffic information update method shown in FIG. 2.

As shown in FIG. 6, the server includes a processor 601, a communications unit 602, and a memory 603. These components communicate with each other by using one or more buses. A person skilled in the art may understand that a structure of the server shown in the figure does not constitute a limitation on the disclosure. The server may be in a bus type structure, or may be in a star type structure, and may include more or fewer parts than those shown in the figure, or some parts may be combined, or a different part deployment may be used.

The processor 601 is a control center of the electronic device, is connected to all parts of the entire electronic device by using various interfaces and lines, and performs various functions of the electronic device and/or data processing by running or executing a software program and/or a module that are/is stored in the memory 603 and invoking data stored in the memory 603. The processor 601 may include an IC, for example, may include a single packaged IC, or may include multiple packaged ICs that are connected and that have a same function or different functions. For example, the processor 601 may include only a CPU, or may be a combination of a GPU, a DSP, and a control chip (for example, a baseband chip) in the communications unit 602. In an implementation of the disclosure, the CPU may include a single computing core, or may include multiple computing cores.

The communications unit 602 is configured to establish a communication channel, so that the server is connected to a terminal or another server by using the communication channel, for communication. For example, the server may receive a message sent by the terminal, and may also return a response message to the terminal or send, to the terminal, data corresponding to the message sent by the terminal. This is not limited in this embodiment of the disclosure.

The memory 603 may be configured to store the software program and the module. The processor performs various functional applications of the server and implements data processing by running the software program and the module that are stored in the memory 603.

The communications unit 602 is configured to receive a traffic sign adding instruction sent by a first terminal. The traffic sign adding instruction is generated by the first terminal after the first terminal recognizes a first traffic sign from a road image, and is used to instruct the server to add second alert information corresponding to the first traffic sign to traffic information of the server.

The processor 601 is configured to generate the second alert information; add the second alert information to the traffic information of the server; and generate update information according to traffic information that is of the server and that is obtained after the second alert information is added, to update traffic information of a second terminal.

Optionally, the communications unit 602 is further configured to send the update information to the second terminal, to instruct the second terminal to update the traffic information of the second terminal.

Optionally, the processor 601 may be further configured to determine whether the traffic information of the server includes alert information corresponding to the first traffic sign; and when the traffic information of the server does not include the alert information corresponding to the first traffic sign, generate the second alert information corresponding to the traffic sign adding instruction.

Optionally, the processor 601 may be further configured to, when the traffic sign adding instruction includes first content and a first location, generate alert information that includes the first content and the first location.

Optionally, the processor 601 may be further configured to, when the traffic sign adding instruction includes first content, a first location, and a pointing direction, generate alert information that includes the first content, the first location, and the pointing direction.

Optionally, the processor 601 may be further configured to determine incremental alert information. The incremental alert information is alert information that is included in the traffic information of the server but that is not included in the traffic information of the second terminal; and determine incremental alert information, where the incremental alert information is alert information that is included in the traffic information of the server but that is not included in the traffic information of the second terminal.

By using this embodiment, the server can directly update the traffic information according to the information reported by the terminal, thereby avoiding problems of waste of human and material resources and poor timeliness that are caused when the traffic information of the server is updated according to information collected by technical personnel.

During specific implementation, the disclosure further provides a computer storage medium. The computer storage medium may store a program, and when the program is executed, some or all of the steps in the embodiments of the traffic information update methods provided in the disclosure may be performed. The storage medium may be a magnetic disk, an optical disc, a read-only memory (ROM), a random access memory (RAM), or the like.

A person skilled in the art may clearly understand that the technologies in the embodiments of the disclosure may be implemented by software in addition to a necessary general hardware platform. Based on such an understanding, the technical solutions of the disclosure essentially or the part contributing to the prior art may be implemented in a form of a software product. The software product may be stored in a storage medium, such as a ROM/RAM, a magnetic disk, or an optical disc, and includes several instructions for instructing a computer device (which may be a personal computer, a server, or a network device) to perform the methods described in the embodiments or some parts of the embodiments of the disclosure.

The embodiments in this specification are all described in a progressive manner. For same or similar parts in the embodiments, refer to these embodiments. Each embodiment focuses on a difference from other embodiments. Especially, apparatus, server, and system embodiments are basically similar to the method embodiments, and therefore are described briefly. For related parts, refer to partial descriptions in the method embodiments.

The foregoing descriptions are implementations of the disclosure, but are not intended to limit the protection scope of the disclosure. Any modification, equivalent replacement, and improvement made without departing from the spirit and principle of the disclosure shall fall within the protection scope of the disclosure.

The invention claimed is:

1. A method, implemented by a first terminal, comprising:
receiving an indication of a speed limit sign, wherein the indication of the speed limit sign comprises a location of the speed limit sign and first alert information of the speed limit sign, and wherein the first alert information comprises a currently obtained speed limit of the speed limit sign;
detecting whether traffic information of the first terminal comprises the first alert information associated with the speed limit sign by:

performing a first query based on the location of the speed limit sign to determine whether the traffic information of the first terminal comprises information associated with the location of the speed limit sign;

determining that the traffic information of the first terminal has the information associated with the location of the speed limit sign;

performing a second query based on the currently obtained speed limit indicated by the speed limit sign to determine whether the information associated with the location of the speed limit sign comprises the currently obtained speed limit indicated by the speed limit sign; and determining either that the information associated with the location of the speed limit sign comprises the currently obtained speed limit indicated by the speed limit sign or that the information associated with the location of the speed limit sign does not comprise the currently obtained speed limit indicated by the speed limit sign;

generating a traffic sign updating instruction corresponding to the speed limit sign when the information associated with the location of the speed limit sign does not comprise the currently obtained speed limit indicated by the speed limit sign; and sending the traffic sign updating instruction including the currently obtained speed limit indicated by the speed limit sign to a server.

2. The method of claim 1, wherein generating the traffic sign updating instruction corresponding to the speed limit sign comprises generating the traffic sign updating instruction to add content of the speed limit sign, and wherein the content of the speed limit sign comprises the currently obtained speed limit associated with the speed limit sign.

3. The method of claim 1, further comprising generating the first alert information when the traffic information in the first terminal does not comprise the first alert information.

4. The method of claim 1, wherein the traffic sign updating instruction comprises a pointing direction of the speed limit sign and the location of the speed limit sign.

5. A system for updating traffic information at a server, comprising:

a first terminal in communication with the server and comprising:
an input device configured to receive an indication of a speed limit sign, wherein the indication of the speed limit sign comprises a location of the speed limit sign and first alert information of the speed limit sign, and wherein the first alert information comprises a currently obtained speed limit of the speed limit sign;
a memory configured to store traffic information in the first terminal; and
a processor coupled to the input device and the memory and configured to:
detect whether the traffic information comprises the first alert information associated with the speed limit sign by:
performing a first query based on the location of the speed limit sign to determine whether the traffic information of the first terminal comprises information associated with the location of the speed limit sign;
determining that the traffic information of the first terminal has the information associated with the location of the speed limit sign;

performing a second query based on the currently obtained speed limit indicated by the speed limit sign to determine whether the information associated with the location of the speed limit sign comprises the currently obtained speed limit indicated by the speed limit sign; and determining either that the information associated with the location of the speed limit sign comprises the currently obtained speed limit indicated by the speed limit sign or that the information associated with the location of the speed limit sign does not comprise the currently obtained speed limit indicated by the speed limit sign;

generate a traffic sign updating instruction corresponding to the speed limit sign when the information associated with the location of the speed limit sign does not comprise the currently obtained speed limit indicated by the speed limit sign; and send the traffic sign updating instruction including the currently obtained speed limit indicated by the speed limit sign to the server; and a second terminal in communication with the server and configured to receive update information from the server, wherein the update information comprises the location and the currently obtained speed limit of the speed limit sign.

6. The system of claim 5, wherein the processor is further configured to generate the traffic sign updating instruction to add content of the speed limit sign, and wherein the content of the speed limit sign comprises the currently obtained speed limit associated with the speed limit sign.

7. The system of claim 5, wherein the processor is further configured to generate the first alert information when the traffic information in the first terminal does not comprise the first alert information.

8. The system of claim 5, wherein the traffic sign updating instruction comprises a pointing direction of the speed limit sign and the location of the speed limit sign.

9. A terminal comprising:
an input device configured to receive an indication of a speed limit sign, wherein the indication of the speed limit sign comprises a location of the speed limit sign and first alert information of the speed limit sign, and wherein the first alert information comprises a currently obtained speed limit of the speed limit sign;
a memory configured to store traffic information; and
a processor coupled to the input device and the memory and configured to:
detect whether the traffic information comprises the first alert information associated with the speed limit sign by:
performing a first query based on the location of the speed limit sign to determine whether the traffic information of the terminal comprises information associated with the location of the speed limit sign;
determining that the traffic information of the terminal has the information associated with the location of the speed limit sign;
performing a second query based on the currently obtained speed limit indicated by the speed limit sign to determine whether the information associated with the location of the speed limit sign comprises the currently obtained speed limit indicated by the speed limit sign; and determining either that the information associated with the location of the speed limit sign comprises the currently obtained speed limit indicated by the speed limit sign or that the information associated with the location of the speed limit sign does not comprise the currently obtained speed limit indicated by the speed limit sign;

generate a traffic sign updating instruction including the currently obtained speed limit indicated by the speed limit sign corresponding to the speed limit sign when the information associated with the location of the speed limit sign does not comprise the currently obtained speed limit indicated by the speed limit sign; and send the traffic sign updating instruction to a server.

10. The terminal of claim 9, wherein the processor is further configured to generate the traffic sign updating instruction to add content of the speed limit sign, and wherein the content of the speed limit sign comprises the currently obtained speed limit associated with the speed limit sign.

11. The terminal of claim 9, wherein the processor is further configured to generate the first alert information when the traffic information at the terminal does not comprise the first alert information.

12. The terminal of claim 9, wherein the traffic sign updating instruction comprises a pointing direction of the speed limit sign and the location of the speed limit sign.

13. The method of claim 1, wherein the traffic sign updating instruction comprises the location of the speed limit sign, and wherein the location of the speed limit sign comprises a longitude and latitude coordinate point.

14. The method of claim 1, wherein the traffic sign updating instruction comprises the location of the speed limit sign, and wherein the location of the speed limit sign comprises a longitude and latitude coordinate range.

15. The method of claim 1, wherein the traffic sign updating instruction comprises the location of the speed limit sign, and wherein the location of the speed limit sign comprises relative coordinates or a coordinate range obtained using a reference point as a coordinate origin.

16. The system of claim 5, wherein the traffic sign updating instruction comprises the location of the speed limit sign, and wherein the location of the speed limit sign comprises a longitude and latitude coordinate point.

17. The system of claim 5, wherein the traffic sign updating instruction comprises the location of the speed limit sign, and wherein the location of the speed limit sign comprises a longitude and latitude coordinate range.

18. The system of claim 5, wherein the traffic sign updating instruction comprises the location of the speed limit sign, and wherein the location of the speed limit sign comprises relative coordinates or a coordinate range obtained using a reference point as a coordinate origin.

19. The terminal of claim 9, wherein the traffic sign updating instruction comprises the location of the speed limit sign, and wherein the location of the speed limit sign comprises a longitude and latitude coordinate point or a longitude and latitude coordinate range.

20. The terminal of claim 9, wherein the traffic sign updating instruction comprises the location of the speed limit sign, and wherein the location of the speed limit sign comprises relative coordinates or a coordinate range obtained using a reference point as a coordinate origin.

* * * * *